(12) United States Patent
Schloemer

(10) Patent No.: US 12,301,331 B2
(45) Date of Patent: May 13, 2025

(54) SATELLITE MESH SYSTEMS AND METHODS FOR CREATING RADIO ROUTES BETWEEN MOVING USERS

(71) Applicant: STAR MESH LLC, Princeton Junction, NJ (US)

(72) Inventor: Gerald R. Schloemer, Round Lake, IL (US)

(73) Assignee: STAR MESH LLC, Princeton Junction, NJ (US)

( * ) Notice: Subject to any disclaimer, the term of this patent is extended or adjusted under 35 U.S.C. 154(b) by 637 days.

(21) Appl. No.: 17/539,236

(22) Filed: Dec. 1, 2021

(65) Prior Publication Data

US 2022/0173795 A1 Jun. 2, 2022

Related U.S. Application Data

(60) Provisional application No. 63/182,341, filed on Apr. 30, 2021, provisional application No. 63/136,664, filed on Jan. 13, 2021, provisional application No. 63/132,026, filed on Dec. 30, 2020, provisional application No. 63/120,409, filed on Dec. 2, 2020, provisional application No. 63/120,600, filed on Dec. 2, 2020.

(51) Int. Cl.
H04B 7/185 (2006.01)
H04W 16/28 (2009.01)
H04W 40/02 (2009.01)
H04W 84/18 (2009.01)

(52) U.S. Cl.
CPC ..... *H04B 7/18504* (2013.01); *H04B 7/18513* (2013.01); *H04W 16/28* (2013.01); *H04W 40/02* (2013.01); *H04W 84/18* (2013.01)

(58) Field of Classification Search
CPC ............ H04B 7/18504; H04B 7/18513; H04B 7/18584; H04W 16/28; H04W 40/02; H04W 84/18; Y02D 30/70
See application file for complete search history.

(56) References Cited

U.S. PATENT DOCUMENTS

| | | | |
|---|---|---|---|
| 10,084,536 | B1 | 9/2018 | Schloemer |
| 10,085,200 | B1 | 9/2018 | Schloemer |
| 10,291,316 | B1 | 5/2019 | Schloemer |
| 10,447,381 | B2 | 10/2019 | Schloemer |
| 10,784,953 | B2 | 9/2020 | Schloemer |

(Continued)

Primary Examiner — Fred A Casca
(74) Attorney, Agent, or Firm — David M. Quinlan, P.C.

(57) ABSTRACT

A radio communication system includes a constellation of aerial nodes (satellites and/or drones and/or balloons) for providing one or more nodes of a radio route capable of transmitting data to and from mobile terrestrial nodes, such as wheeled vehicles, aircraft, and personal computing devices like smartphones and tablet computers. The mobile terrestrial nodes comprise a plurality of directional antennas for transmitting and receiving radio signals in the space above the mobile node and circuitry for processing radio signals received on the antennas from aerial nodes and selecting for data transmissions one of said directional antennas based on the relative qualities of the received radio signals. The aerial and terrestrial nodes can send and receive data in different radio technologies (signal formats) and over different aerial routes to maintain data integrity as the mobile terrestrial nodes move from place to place.

19 Claims, 6 Drawing Sheets

(56) References Cited

U.S. PATENT DOCUMENTS

| | | |
|---|---|---|
| 10,791,493 B2 | 9/2020 | Schloemer |
| 10,979,136 B2 | 4/2021 | Schloemer |
| 10,998,962 B2 | 5/2021 | Schloemer |
| 11,038,586 B2 | 6/2021 | Schloemer |
| 11,206,079 B2 | 12/2021 | Schloemer |
| 11,356,921 B2 | 6/2022 | Schloemer |
| 11,832,160 B2 | 11/2023 | Schloemer |
| 11,855,745 B2 | 12/2023 | Schloemer |
| 11,870,543 B2 | 1/2024 | Schloemer |
| 11,968,023 B2 | 4/2024 | Schloemer |
| 12,063,101 B2 | 8/2024 | Schloemer |
| 12,074,686 B2 | 8/2024 | Schloemer |
| 12,081,310 B2 | 9/2024 | Schloemer |
| 12,119,919 B2 | 10/2024 | Schloemer |
| 2019/0104462 A1* | 4/2019 | Schloemer ............ H04W 40/12 |

\* cited by examiner

SATELLITE MESH SYSTEMS AND METHODS FOR CREATING RADIO ROUTES BETWEEN MOVING USERS

CROSS-REFERENCE TO RELATED PATENTS AND APPLICATIONS

This application claims benefit of the assignee's U.S. provisional application No. 63/120,409 filed Dec. 2, 2020, U.S. provisional application No. 63/120,600 filed Dec. 2, 2020, U.S. provisional application No. 63/132,026 filed Dec. 30, 2020, U.S. provisional application No. 63/136,664 filed Jan. 13, 2021, and U.S. provisional application No. 63/182,341 filed Apr. 30, 2021, the entire contents of all of which are incorporated by reference as part of the present disclosure as if set out in full herein. Also incorporated by reference as part of the present disclosure as if set out in full herein are the assignee's U.S. Pat. No. 10,979,136 issued Apr. 13, 2021 ("the '136 patent"), the assignee's U.S. application Ser. No. 17/322,950 filed May 18, 2021 ("the '950 application"), and the assignee's pending application entitled "Systems and Methods for Creating Radio Routes and Transmitting Data Via Orbiting and Non-Orbiting Nodes," filed concurrently herewith under ("the '1018 application").

BACKGROUND OF THE DISCLOSED TECHNOLOGY

Technical Field of the Present Disclosure

The disclosure herein relates generally to transmitting data between mobile terrestrial nodes via a constellation of satellites orbiting the earth, optionally in combination with drones or balloons providing intermediate connections (i) between one or more of the mobile terrestrial nodes, or (ii) between the drones or balloons and one or more of the orbiting satellites; in one more particular aspect the disclosure relates to communications systems and methods using novel routing protocols and node designs for enhancing data transmission integrity between mobile terrestrial nodes via satellites that can be distributed stochastically at indeterminate geolocations and do not have precision, on-board attitude control.

Review of the Assignee's Satellite Communication Technology

The assignee Star Mesh LLC has an extensive intellectual property portfolio comprising issued patents and pending applications relating to space-based communications between terrestrial users via a constellation of orbiting satellites and other types of aerial nodes such as drones and balloons. In addition to the patents and applications already listed in the "Cross-Reference" section above, various other aspects and capabilities of the assignee's communications systems are described in U.S. Pat. Nos. 10,084,536, 10,085,200, 10,291,316, and 10,447,381, as well as pending U.S. application Ser. No. 17/367,663. Star Mesh's IP also includes worldwide patent holdings based on its domestic portfolio.

The assignee's IP describes a revolutionary way of enabling data to be sent from an originating system node to a destination system node via aerial nodes, particularly orbiting satellites. As described in the patents and applications named above, the assignee's communications systems are advantageously effected by a constellation of satellites in stochastically distributed, unconstrained orbits. (Terms are used throughout the present document according to the definitions in the '136 patent, particularly at column 4, line 57, to column 6, line 58, unless the context or the present disclosure suggests otherwise.) One manner of realizing a satellite distribution for implementing communications systems such as those discussed herein would be to deploy small groups of satellites at different times at one or more latitudes. Over time, the satellites, particularly those in different groups will, for all practical purposes, appear to be randomly distributed due to effects such as the inevitable increase of slight differences in launch orbits at different deployment times and in orbital decay rates of all of the satellites. Thus, the satellites' positions relative to each other and to any particular ground location would be unknown, and constantly changing, effectively resulting in a stochastic distribution. In another advantageous implementation the satellites carry no active attitude control mechanism. It is generally preferred that all of the satellites be launched in an easterly direction to take advantage of the earth's rotation to assist launch velocity. This will also avoid excessive Doppler effects resulting from increased relative velocities of pairs of satellites launched in opposite directions, and thus contribute to the creation of more stable routes. Put another way, launching all of the satellites in an easterly direction will on average present fewer potential radio links that will be eliminated from consideration, because Doppler effects exhibited by counter-orbiting satellites indicate that they form links of poorer quality than links between satellites orbiting in the same direction. (See paragraphs 00139-140 of the '1018 application for a fuller discussion of Doppler effects on route creation.)

The assignee's satellites have the potential to be several orders of magnitude less expensive to design and produce than satellites proposed by others that require rocket thrusters and sophisticated guidance systems to maintain their attitude and orbital position so that their antennas line up with antennas on the ground and in other satellites. In addition, satellites without heavy thrusters don't have to carry rocket fuel, making them still lighter, the combined effect of which is to make them cheaper to inject into orbit.

An important parameter in a communication system in which an aerial node, such as a satellite, exchanges radio signals with ground nodes and/or other satellites is the distance from the satellite to the horizon on the earth's surface. FIGS. 1A and 1B of the '136 patent illustrate the relationship between the altitude of an aerial node such as a satellite S and its surface "footprint" defined by the distance from the satellite to the horizon EH. A ground station beyond that distance cannot see the satellite and thus cannot exchange radio signals with it. If the satellite S is at an altitude AL of 200 miles, it will have a footprint on the earth's surface relating to the distance DH=1,280 miles to the horizon EH. This is the radius within which a satellite will theoretically be in line of sight of a point on the ground. The satellite's footprint (the area of the earth's surface visible to the satellite) is $\pi*DH^2 \approx 5,100,000$ sq. mi. By the same token, the distance two satellites in circular orbits at the same altitude can see each other is in most satellite locations roughly twice the distance DH. One of the challenges in any satellite-based communication system is to design the satellites and ground stations so that their respective antennas can be paired to create radio links over these large distances.

The following table sets out for aerial nodes (satellites, drones, and balloons) of different altitudes their distances to the horizon (DH), and footprints. To avoid interfering with commercial aviation, drones and balloons must be above about 10 miles; by FAA regulation, drones can also fly below 400 feet as long as they are not in otherwise restricted airspace, such as near an airport. As used in the present disclosure, the term drone means a heavier-than-air unmanned aircraft, typically powered by electric motors run on batteries charged by onboard solar panels. Drones can either be capable of hovering in place or maintained by lift created by movement through the atmosphere.

TABLE 1

| Altitude - AL (miles) | Distance to Horizon - DH (miles) | Footprint - $\pi*DH^2$ (sq. mi.) |
|---|---|---|
| ≤400 ft. (drone) | 280 ≤ DH ≤ 400 | 250,000 ≤ FP ≤ 500,000 |
| 10-20 (drone*/balloon) | 900 | |
| 100 | 1,280 | 2,500,000 |
| 200 | 1,830 | 5,100,000 |
| 400 | 2,000 | 10,500,000 |
| 500 | 2,600 | 12,500,000 |
| 800 | 3,000 | 21,200,000 |
| 1000 | 26,000 | 28,300,000 |
| 22,230 (Geostationary) | | $2.1 \times 10^9$ |

*Drones may have operational altitude limits due to low atmospheric density.

This table reveals one of the trade-offs involved in designing a satellite-based communication system, in that the distance to the horizon and the corresponding footprint increase as the node altitude increases, but the strength of the radio signals between the aerial nodes and the ground is attenuated as the altitude increases. This and other design considerations are discussed in the sections that follow.

The assignee's prior patents relate to specific aspects of the assignee's patented technology that take into account numerous characteristics of space-based satellite communications systems. The assignee's U.S. Pat. No. 10,084,536 ("the '536 patent"), discloses a method involving launching satellites into low earth orbits without rockets (and rocket fuel) that control orbits and control attitude, and thus drastically reduce the cost of satellite communication systems. (The '536 patent is incorporated by reference as part of the present disclosure as if set out in full herein.)

The '536 patent discusses some of the basic principles underlying the assignee's routing protocols for creating routes from an originating ground node to a destination ground node via a constellation of satellites in stochastically distributed, unconstrained orbits without attitude control. In such a system, there is no guarantee that any satellite will have an antenna pointed at a particular ground location or at another satellite. Since the orbital paths of the satellites are not controlled, route creation and data transmission rely on the probability of linking antennas on satellites to antennas on the ground stations and other satellites in the manner discussed in the patent. As it described therein (and in other patents of the assignee), an acceptable level of service can be obtained by launching a sufficient number of satellites to provide a statistically significant opportunity for route creation, which is possible because the satellites can be made and launched at a very low cost.

The '536 patent introduces the feature of selecting a preferred or optimum route by an algorithm that makes sequential decisions as routing messages are transmitted between satellites and ground stations, and between satellites. The '536 patent describes a system with ground stations that have complex antenna systems that amplify signals from any direction and satellites with antennas distributed around the spherical space surrounding the satellite. This arrangement, coupled with a constellation including a sufficient number of these inexpensive satellites, results in an acceptable statistical probability of creating one or more complete routes between any two ground stations on demand (or within a reasonable dwell time).

As such, the assignee's satellite communications are based on a paradigm different from prior approaches such as Iridium® fixed polar orbit systems. An example of a system based on the Iridium® approach might consist of satellites in tightly controlled polar orbits at 500-mile altitudes, which would require at least 64 satellites to enable the complete line-of-sight communications necessary to provide worldwide service. The satellites thus would need expensive control systems and heavy rocket thrusters and fuel to maintain them in positions that would ensure that radio links could be made between them and with ground stations. In contrast, a comparable system based on principles disclosed in the assignee's '536 patent and the others discussed herein, can be accomplished with about 200 or so lightweight, inexpensive-to-make stochastically distributed satellites that don't have thrusters or rocket fuel to maintain them in a particular attitude, altitude, or orbital path. Such a system could be made and deployed at a small fraction of the cost—likely less by multiple orders of magnitude—than prior space-based systems.

The assignee's '1018 application discusses at paragraphs 0048-0053 certain principles underlying route creation in such a system. Although the assignee's referenced patents and applications describe various embodiments of its systems and methods, they relate primarily to route creation and data communications between ground stations with plural directional antennas capable of transmitting and receiving radio signals around substantially the entire semi-spherical space above the surface of the earth. The satellites also comprise a plurality of directional antennas capable of transmitting and receiving radio signals around substantially the entire spherical space surrounding the satellite. Route creation involves sending initial information signals from all of the antennas of all of the ground stations, and then transmitting routing messages from all of the antennas of a satellite that receives an initial information signal. Since the antennas are directional, usually only one antenna in a satellite will receive an initial information signal from a given ground station. The satellite stores the identity of the antenna on which it received the initial information signal and the address of the ground station that sent it. The routing messages transmitted from the satellite include the address of the sending ground station and a quality of the initial information signal received at the satellite. The concept of "quality" in route creation is discussed in more detail in the assignee's '1018 application at paragraphs 0076-0086. However, an important aspect of routing and data transmission methods described herein is that they are also applicable to systems using satellites maintained in particular orbits and fixed attitudes.

Satellites that receive routing messages in turn save addresses of the sending ground stations contained in the received routing messages and the antennas on which the routing messages were received. They transmit from all of their antennas further routing messages that comprise information on the quality of the respective routing messages they have received and the addresses of the sending ground station. A ground station node that receives a routing message (a "receiving ground station") from a satellite stores the antenna on which the routing message was received and its quality. When a receiving ground station node receives routing messages on two antennas identifying different routes (that is, one via a different satellite or satellites) to the sending ground station, it typically selects the antenna to use for data transmissions to the sending ground station based on a composite quality based on the quality information in the respective received routing message and the quality of the received routing message itself. The system is based on the principle of antenna reciprocity, whereby certain reception and transmission properties of a given antenna are identical, such as its radiation pattern and the value of its directivity, This allows links of a radio route to be assembled in one direction, from a first ground station where data transmission will originate, toward a second ground station to which it is addressed, and for data to be transmitted in the other direction, from the second ground station to the first. Although the creation of node-to-node radio links relies on the probability that directional antennas in the satellites (or other aerial nodes) will line up with each other and with the directional antennas at the ground stations, the '1018 application explains that with a sufficient number of satellites or other types of aerial nodes, the probability that a radio route can be constructed between any two ground stations at any given time can support data transmissions between ground nodes to provide a viable communication system.

The assignee's '136 patent describes advanced routing protocols and satellite designs based on the fundamentals of the satellite communications approach described in preceding paragraphs. Other implementations can involve deploying aerial nodes in layered cohorts in the following fashion:

Layer/Cohort A: Drones below an altitude 400 ft., or drones and/or balloons at altitudes of 10-20 miles (see Table 1).

Layer/Cohort B: Very low earth orbit ("VLEO") satellites at altitudes of 200-400 miles. These satellites will see decaying orbits due to aerodynamic drag, but will retain their usefulness in the system until their orbits decay to about 100 miles in altitude. (See the assignee's U.S. application Ser. No. 17/367,663 [1016] describing satellites with a streamlined shape designed to maximize time in orbit of very low altitude satellites in the absence of onboard propulsion.)

Layer/Cohort C: Low earth orbit ("LEO") satellites at 800-1000 miles.

Layer/Cohort D: Satellites orbiting above 2000 miles. In some applications, geostationary satellites can be included in this layer. (See Table 1. )

The manner in which routes are created in a multi-layer system such as this, and the advantages gained thereby, are discussed in more detail in the '1018 application at paragraphs 00111-00145.

The discussion of preferred embodiments further below sometimes uses the terminology "originating ground node" to mean a receiving ground node that has data on board addressed to a "destination ground node." The destination ground node comprises the route's sending ground node that initiated the route creation process, as described above. In the present disclosure, the term "ground node" or "terrestrial node" can refer to ground stations at fixed locations, such as terrestrial cellular telephone switches, and to mobile nodes that can move from place to place under motive power while transmitting and receiving data. The term "mobile ground node" or "mobile terrestrial node" can also refer to an aircraft in flight serving as an originating node from which a passenger desires to transmit data to a destination ground node comprising another aircraft in flight or to a destination ground node actually on the earth's surface; or it can be a destination ground node on the earth's surface from which a system user desires to transmit data to an aircraft in flight or to another system ground node on the earth's surface. The term "mobile ground node" or "mobile terrestrial node" can also refer to a moving surface vehicle (such as an automobile) from which an occupant desires to transmit data to a destination ground node comprising an aircraft in flight or to a destination node actually on the earth's surface; or it can be an originating node on the earth's surface from which a system user desires to transmit data to an aircraft in flight or to another system node on the earth's surface. Examples of other types of mobile ground nodes are, without limitation, portable devices such as smartphones and tablet computers, trucks and buses, and ships at sea such as cruise ships, fishing boats (of all sizes) and pleasure boats. Accordingly, it will be understood that terms such as "mobile ground node" and "mobile terrestrial node" used in this disclosure and the appended claims are meant to be interpreted broadly as including any node that forms the terminus of a route from which data is transmitted (an "originating node") or at which it is received (a "destination node"), whether or not it is physically on the earth's surface, in the air above the surface, or on a body of water.

Because fixed terrestrial ground stations such as cellular telephone switches and WiFi routers are not subject to the power limitations of the aerial nodes, they are capable of transmitting very powerful radio signals. They can also have directional antennas around substantially the entire semi-spherical space above the surface of the earth to maximize the number of aerial nodes with which they can potentially form radio links. However, mobile ground nodes such as vehicles, aircraft and personal devices, while still having access to more power than aerial nodes, as a practical matter will have many fewer antennas than the number in a terrestrial ground station at a fixed location. This accordingly reduces the number of satellites or other aerial nodes with which mobile ground nodes will form radio links.

The present specification describes novel configurations of mobile ground station nodes that maximize the number of antenna pairings between the mobile ground stations and the system's aerial nodes. Moreover, those radio routes that are formed may have lower overall qualities than routes involving fixed location ground stations with antennas that fill the space surrounding the ground stations with radio signals and thereby provide more opportunities for antenna pairing. The present specification also discloses a technique for improving the integrity of data transmissions in radio routes involving mobile ground station nodes by using diversity principles disclosed in the '950 application.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 1 depicts one embodiment of a mobile ground node comprising a commercial aircraft having multiple directional antenna modules distributed around the aircraft to maximize coverage of the surrounding semi-spherical space above the aircraft, wherein

FIG. 2 depicts one embodiment of a mobile ground node comprising a passenger vehicle having multiple directional antenna modules distributed around the vehicle to maximize coverage of the surrounding semi-spherical space above the vehicle wherein

Figure 1A:
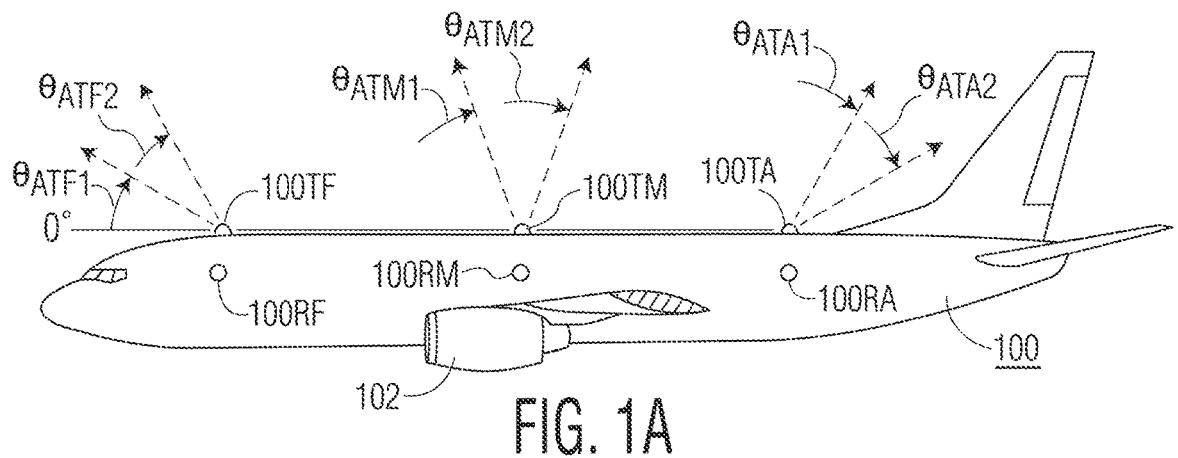
FIG. 1A is a side view of the aircraft.

One skilled in the art will readily understand that the drawings are not strictly to scale, but nevertheless will find them sufficient, when taken with the detailed descriptions of preferred embodiments that follow, to make and use the subject matter described in the appended claims.

DETAILED DESCRIPTION OF EXEMPLARY EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

Examples of Mobile Terrestrial Nodes

The present description uses as examples a commercial aircraft and a passenger automobile to explain certain embodiment of route creation protocols and data transmission techniques that enable space-based communications between users in or on moving conveyances. It will be understood that the same principles apply to other kinds of conveyances, such as those already mentioned. As mentioned, the term "mobile ground node" or "mobile terrestrial node" refers to a node that moves from place to place under motive power applied to it. The motive power can be supplied by any means capable of moving the node from place to place, including an individual carrying a personal computing device or smartphone as they move from place to place.

As a first exemplary embodiment, FIG. 1 depicts a terrestrial mobile node comprising a commercial aircraft 100 in which the motive power is supplied by the thrust of jet engines 102. The aircraft includes multiple antenna modules identified by the reference numeral 100 with a suffix denoting their locations on the aircraft:

Module 100TF comprises a forward antenna module on the top of the aircraft.
Module 100TM comprises a mid-fuselage antenna module on the top of the aircraft.
Module 100TA comprises an aft antenna module on the top of the aircraft.
Module 100RF comprises a forward antenna module on the right side (looking aft) of the aircraft.
Module 100RM comprises a mid-fuselage antenna module on the right side of the aircraft.
Module 100RA comprises an aft antenna module on the right side of the aircraft.
Module 100LF comprises a forward antenna module on the left side of the aircraft.
Module 100LM comprises a mid-fuselage antenna module on the left side of the aircraft.
Module 100LA comprises an aft antenna module on the left side of the aircraft.

Figure 1B:
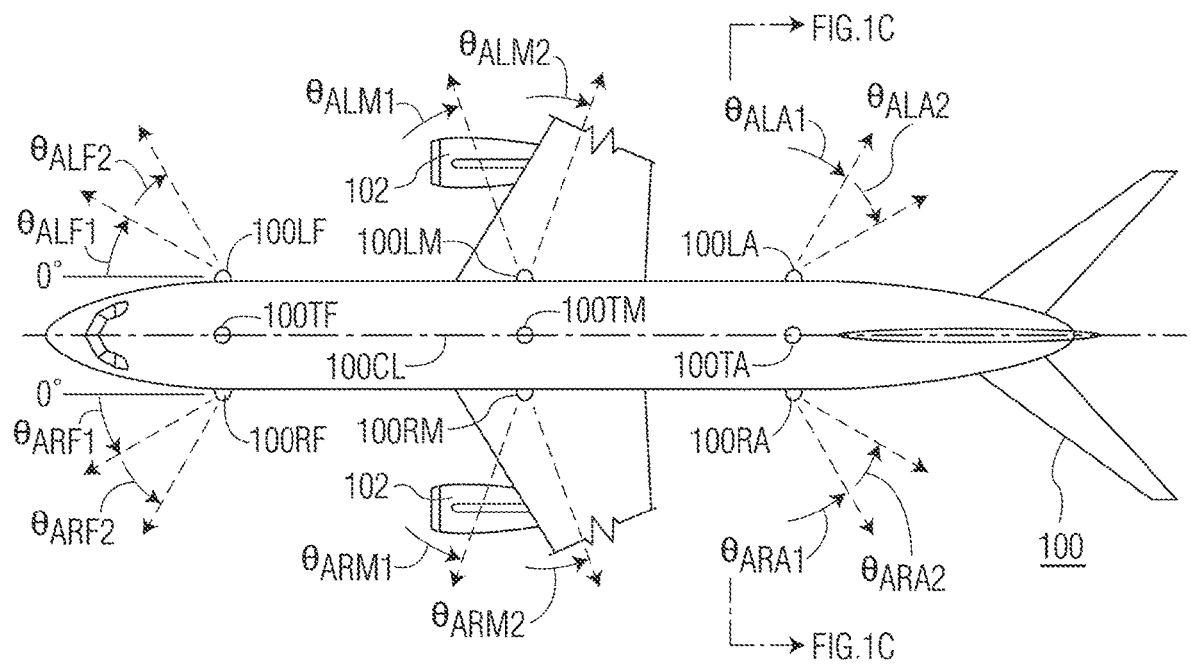
FIG. 1B is a top view of the aircraft.
Figure 1C:
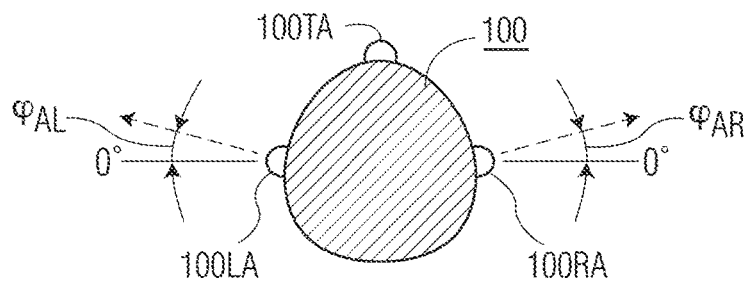
FIG. 1C is a section of the aircraft viewed looking aft at the line FIG. 1C-FIG. 1C in FIG. 1B.

Each of the antenna modules in FIG. 1 is constructed according to principles described in the assignee's '950 application, described in more detail further below in connection with FIG. 3. Each module includes two directional antennas. FIG. 1 illustrates how the beam axes of these antennas point in directions intended to maximize the probability that they will pair with an antenna on a satellite node. In the exemplary embodiment depicted in FIG. 1, the directional antennas point in the directions illustrated in FIGS. 1A, 1B and 1C, relative to the 0° axes in the figures:

FIG. 1A:
Module 100TF—$\theta_{ATF1}$=30°; $\theta_{ATF2}$=60°
Module 100TM—$\theta_{ATM1}$=80°; $\theta_{ATM2}$=100°
Module 100TA—$\theta_{ATA1}$=120°; $\theta_{ATA2}$=150°

FIG. 1B:
Module 100RF—$\theta_{ARF1}$=30°; $\theta_{ARF2}$=60°
Module 100RM—$\theta_{ARM1}$=80°; $\theta_{ARM2}$=100°
Module 100RA—$\theta_{ARA1}$=120°; $\theta_{ARA2}$=150°
Module 100LF—$\theta_{ALF1}$=30°; $\theta_{ALF2}$=60°
Module 100LM—$\theta_{ALM1}$=80°; $\theta_{ALM2}$=100°
Module 100LA—$\theta_{ALA1}$=120°; $\theta_{ALA2}$=150°

FIG. 1C:
$\varphi_{AL}=\varphi_{AR}=15°$

The antennas have beam widths that provide maximum coverage to the sides and the top of the aircraft. In the present embodiment a typical beam width for the top and side antennas will be ±40° to the beam axis. This will cover essentially the entire semispherical space above a horizontal plane when the aircraft is in level flight. It will also provide some downward facing coverage since the beam width will extend to 25° below a horizontal plane, as seen in FIG. 1C. This may assist in forming radio links to satellites that are close to the earth's horizon. An additional enhancement can use multi-feed antennas as shown in FIGS. 19 and 20 and discussed at column 41, line 36, to column 43, lines 42, of the '136 patent.

Since the speed of an aircraft is relatively low compared to that of the satellites comprising providing routes to other ground nodes, aircraft in effect act as stationary ground nodes. Antennas pairing with the satellites is further facilitated by the fact that airplanes tend to fly in straight lines during most of a flight, so that once an antenna on the aircraft pairs with one on a satellite, the link between them will be stable for a relatively longer period of time than in a mobile ground-based mobile node such as a road vehicle (discussed below in connection with FIG. 2) that turns as it follows a road.

FIG. 2 illustrates a like arrangement to FIG. 1, but applied to a surface vehicle represented by an automobile 200. Motive power is supplied by a vehicle engine that drives the vehicle wheels 202. The vehicle includes with multiple antenna modules identified with the reference numeral 200 with a suffix denoting their location on the vehicle:

Module 200TF comprises a forward antenna module under the vehicle hood.

Module 200TM comprises a mid-vehicle antenna module in the vehicle roof.

Module 200TR comprises a rear antenna module in the vehicle trunk.

Module 200RF comprises a forward antenna module on the right side (looking rearward) of the vehicle.

Module 200RR comprises a rear antenna module on the right side of the vehicle.

Module 200LF comprises a forward antenna module on the left side of the vehicle.

Module 200LR comprises a rear antenna module on the left side of the vehicle.

Figure 2A:
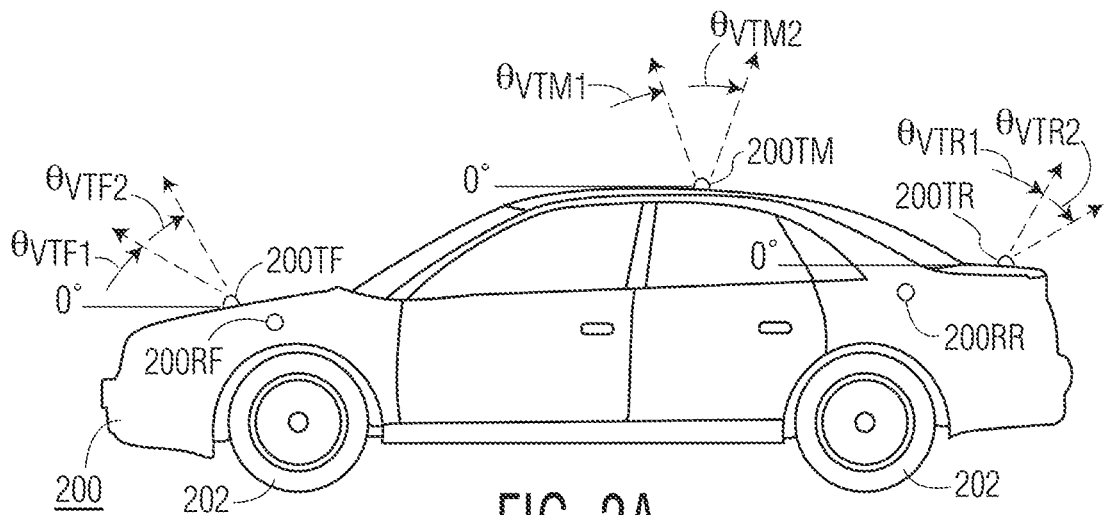
FIG. 2A is a side view of the vehicle.
Figure 2B:
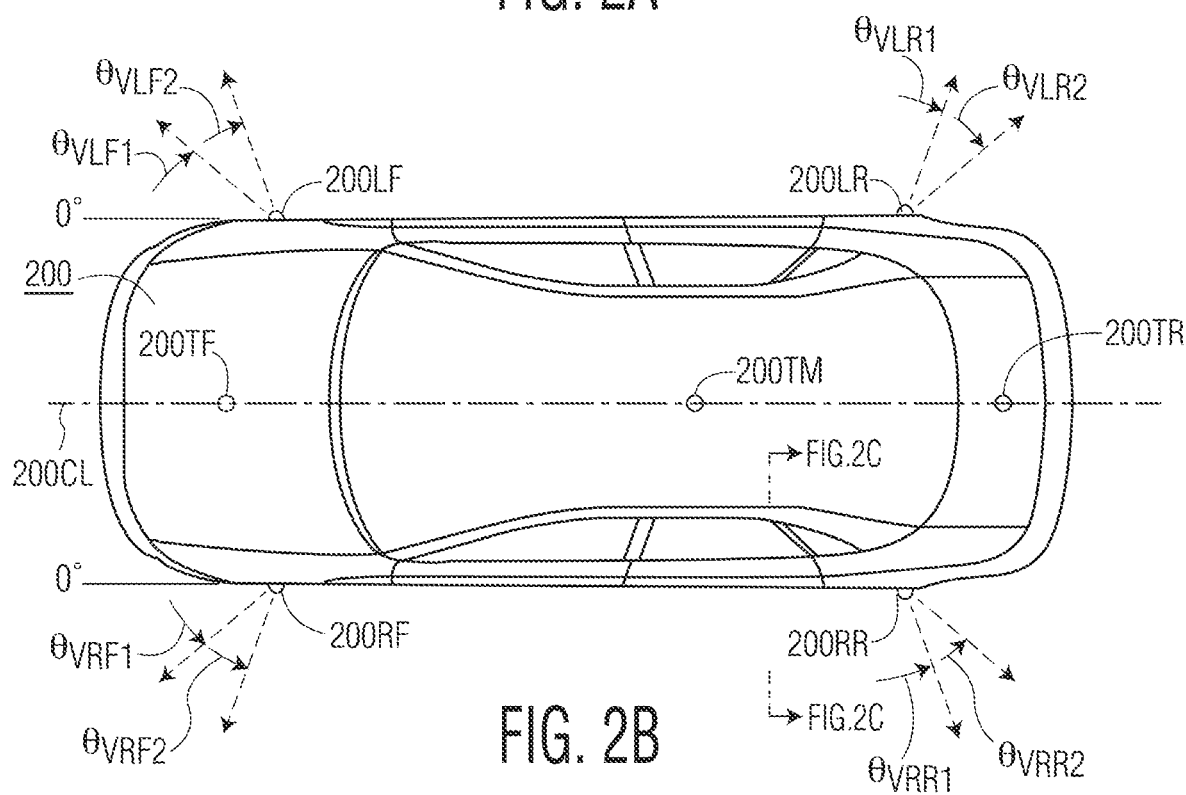
FIG. 2B is a top view of the vehicle.
Figure 2C:
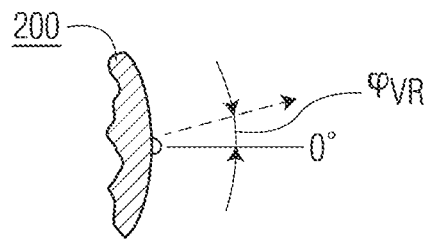
FIG. 2C is a section of the vehicle viewed looking toward the rear taken at the line FIG. 2C-FIG. 2C in FIG. 2B.

Each of the antenna modules 200 in FIG. 2 is also constructed according to principles described in the assignee's '950 application. Each module 200 includes two directional antennas. FIG. 1 illustrates how these antennas point in directions intended to maximize the probability that they will pair with an antenna on a satellite node. In the exemplary embodiment depicted in FIG. 2, the directional antennas point in the directions illustrated in FIGS. 2A, 2B and 2C, relative to the 0° axes in the figures:

FIG. 2A:
Module 200TF—$\theta_{VTF1}=30°$; $\theta_{VTF2}=60°$
Module 200TM—$\theta_{VTM1}=80°$; $\theta_{VTM2}=100°$
Module 200TR—$\theta_{VTR1}=120°$; $\theta_{VTR2}=150°$ FIG. 2B:
Module 200RF—$\theta_{VRF1}=40°$; $\theta_{VRF2}=70°$
Module 200RR—$\theta_{VRR1}=110°$; $\theta_{VRR2}=140°$
Module 200LF—$\theta_{VLF1}=40°$; $\theta_{VLF2}=70°$
Module 200LR—$\theta_{VLR1}=110°$; $\theta_{VLR2}=140°$ FIG. 2C:
$\varphi_{VR}=15°$ (same on the left side; not shown)

As in the aircraft node discussed above, the antennas have beam widths that provide maximum coverage to the sides and the top of the vehicle. In the present embodiment a typical beam width for the top and side antennas will be ±40° to the beam axis. This will cover essentially the entire semispherical space above the earth's surface when the vehicle is on level ground. It will also provide some downward facing coverage since the beam width will extend to 25° below a horizontal plane, as seen in FIG. 2C. This may assist in situations in which the vehicle is on a steep upward slope or on a highly banked curve by maintaining antenna coverage at or near the horizon. As in the aircraft embodiment, the vehicle antennas can comprise multi-feed antennas to the same purpose as discussed in connection with that embodiment.

Antenna placement on mobile nodes is to some extent determined by the space available at various locations on the node and certain design and engineering considerations. For example, in theory all of the antennas on each of the top and sides of an aircraft could be located in a single radio-transparent dome. However, it is more expedient from an aerodynamic and aesthetic viewpoint to avoid adding structure that protrudes from the aircraft fuselage. For example, the parabolic reflectors of the multiple, dual-direction antennas in the aircraft embodiment 100 depicted in FIG. 1 can be made relatively compact and covered by a radio-transparent "window" flush with the aircraft fuselage. The circuit components depicted in FIG. 3 can be located centrally within any available space within a particular mobile ground node. In addition to aesthetic considerations, a vehicle mobile node 200 such as that depicted in FIG. 2 would face space constraints at certain locations, particularly in the case of the antenna module 200TM. Those skilled in the art will understand that the antenna modules will have configurations and placements to accommodate the design and operational requirements and characteristics of the mobile node while still accomplishing the goals set forth herein.

Enhanced Data Transmission Integrity Using Diversity Principles

The assignee's space-based communications systems support the transmission of data (content) between far distant ground stations. However, it is also important to ensure the accuracy of the content of data reaching its destination ground station via systems that rely on radio links between satellites without means for controlling their location or attitude. The '950 application describes the application of diversity techniques to data transmissions in a communications system relying on stochastically distributed satellites without attitude control. The approach described there takes advantage of the availability of numerous radio technologies for transmitting data between terrestrial and aerial nodes of distributed systems such as those described in the assignee's prior patents and applications referenced herein. Examples of technologies that can be used to implement the data transmission methods described herein include (i) frequency modulation, (ii) code division, such as CDMA (code division multiple access), (iii) time division, such as TDMA (time division multiplexing), and (iv) frequency division, such as FDMA (frequency division multiple access). These technologies are already used in various combinations in cellular radio telephony. (In the description that follows, the terms "radio technology" and "signal format" are used interchangeably.)

By way of review, content is transmitted over a route that has been created according to the methods and protocols discussed above with reference to the '1008 application and the '136 patent. Any one of the available radio technologies available in the ground nodes and satellites (and drones and balloons, if present) can be used for the route-creating initial information signals and routing messages that effect route creation. In a preferred embodiment frequency modulated radio signals will be used for route creation. CDMA is another preferred radio technology for route creation. In the manner of the fixed terrestrial ground stations described in the assignee's previous patents and applications, the mobile ground nodes of the present system include an onboard computer to select the antenna or antennas to use for data transmissions based on the relative qualities of routing signals received on all of the antennas that include a particular sending ground node address.

For content transmitted over a thus-established radio route, the concept known as diversity can improve the integrity of the content contained in signals received at the aerial and terrestrial nodes. In the present context, "diversity" refers to:

a. Signal format diversity, in which content is sent multiple times in the same signal format, with each transmission being altered in a predetermined manner, or multiple times in different signal formats, as described below in connection with FIG. 4.

b. Space diversity, in which content is sent multiple times over different signal paths, as described in the '1018 application.

c. Combined diversity, in which the same content is sent over in different signal paths using signal format diversity in each path, as described below in connection with FIG. 5.

In one implementation of these diversity techniques, the content in each transmission is divided into short segments, with multiple error checking codes added between the segments. A computer at the receiving end compares the respective segments and re-creates the content with few or no errors.

These diversity approaches can be applied to the assignee's space-based communications systems to greatly improve the accuracy of the content transmitted via satellites or other aerial nodes (e.g., drones or balloons). Diversity can be even more important in systems involving mobile ground nodes in which radio links between the ground nodes and aerial nodes may be less robust because fewer aerial nodes may receive initial information signals from a moving ground node as compared to a stationary one. That is, a moving ground node will perforce change the positions of its antennas relative to the aerial nodes, which can affect the stability of the routes being created.

In one exemplary version of such a system, a system goal is to provide internet service to a user associated with a mobile ground node such as the vehicle 200 (FIG. 2) via a constellation of satellites in uncontrolled orbits. To clarify terminology again, a route is created by radio signals sent from a remote "sending" ground station, then from one or more satellites, and finally received at a "receiving" ground station (the vehicle 200 in this example). The sending ground station could be another mobile user, in a mobile ground node such as another vehicle, an aircraft, etc., or it could be a user connected (via WiFi, for example) to a fixed ground station. Content, sometimes referred to herein as data, is then transmitted from the receiving ground station, now acting as an "originating" ground station, to the mobile ground node 200, which at this point is the "destination" ground station.

Figure 3:
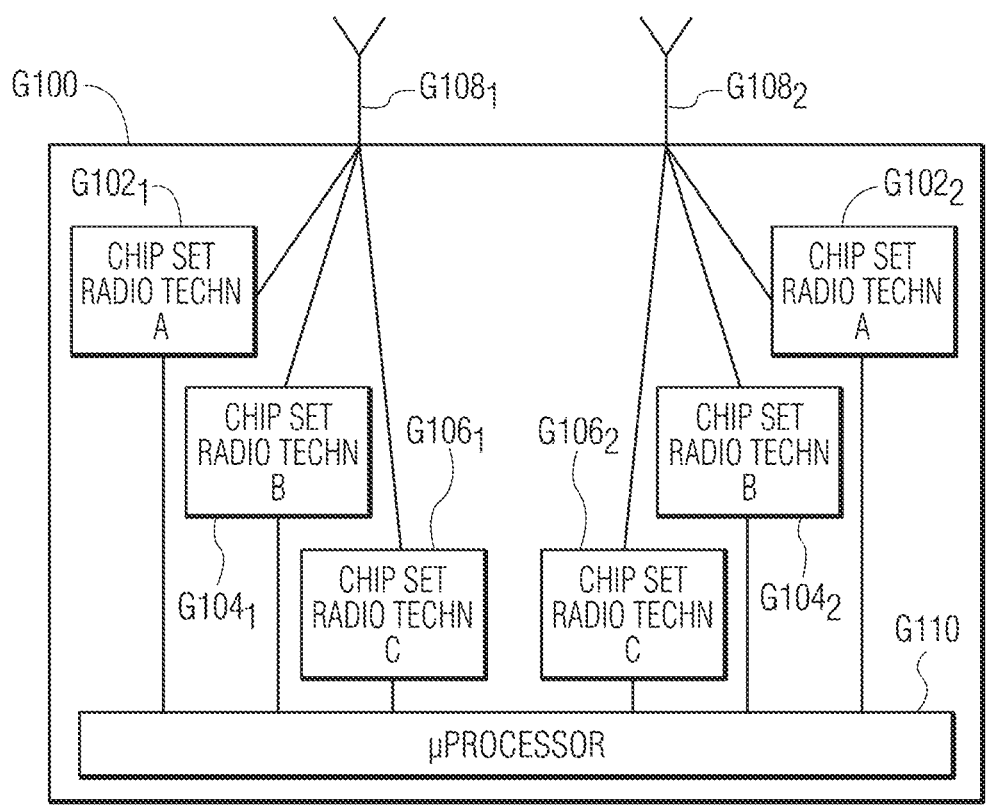
FIG. 3 is a schematic diagram of an embodiment of an antenna module comprising two directional antennas suitable for use in a mobile ground node such as the aircraft and vehicle shown in FIGS. 1 and 2.
Figure 4:
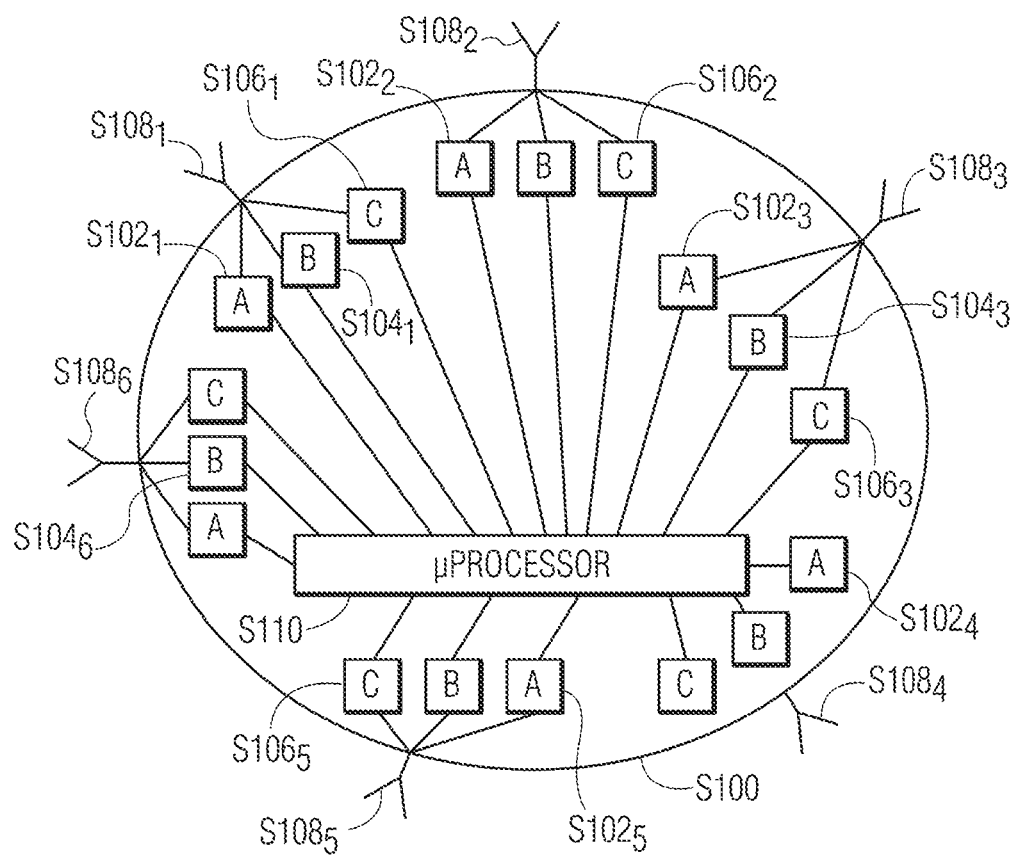
FIG. 4 depicts a satellite configuration having six directional antennas, each of which is associated with three different radio technologies available for route creation and data transmissions in systems including mobile ground nodes such as those shown in FIGS. 1 and 2.

FIGS. 3 and 4 depict ground station and satellite constructions that can implement the diversity techniques described further below in connection with FIGS. 5 and 6. FIG. 3 shows a ground station G100 that includes a first group of three individual chip sets $G102_1$, $G104_1$, and $G106_1$, and a second group of individual chip sets $G102_2$, $G104_2$, and $G106_2$ for coding and decoding radio signals in three respective radio technologies. The chip sets are designated "Radio Techn A," "Radio Techn B," and "Radio Techn C," representing, for example, frequency modulation, code division (e.g., CDMA), and time division (e.g., TDMA), respectively. Other technologies (signal formats), or additional technologies with their own respective chip sets, can also be used, as described further below in connection with FIGS. 5 and 6. The chip set groups are connected to respective antennas $G108_1$ and $G108_2$. A processor G110 selects which radio technology to use to transmit data from the antennas as described further below in connection with FIGS. 5 and 6. Many types of ground station nodes to which the principles described herein are applicable, such as smartphones, have multiple antennas and are thus readily adaptable to employing the diversity techniques described herein are applicable.

FIG. 4 is a schematic depiction of a satellite in a constellation that supports communications between ground nodes, including mobile ground nodes, that employ different radio technologies. FIG. 4 shows a satellite S100 with six groups of chip sets associated with the respective radio technologies. Each chip set group $S102_n$, $S104_n$, and $S106_n$ has a directional antenna $S108_n$ associated with it, where n=6 in the FIG. 4 embodiment. (Some references to the chip sets are omitted from FIG. 4 for clarity.) The satellite S100 further includes a processor S110 for selecting which signal format to use to transmit data from its associated antenna in accordance with the transmission methods described below in connection with FIGS. 5 and 6. These figures illustrate how the diversity principles discussed herein can implement data transmission methods using different satellite embodiments such as those described in the assignee's prior patents and applications.

Figure 5:
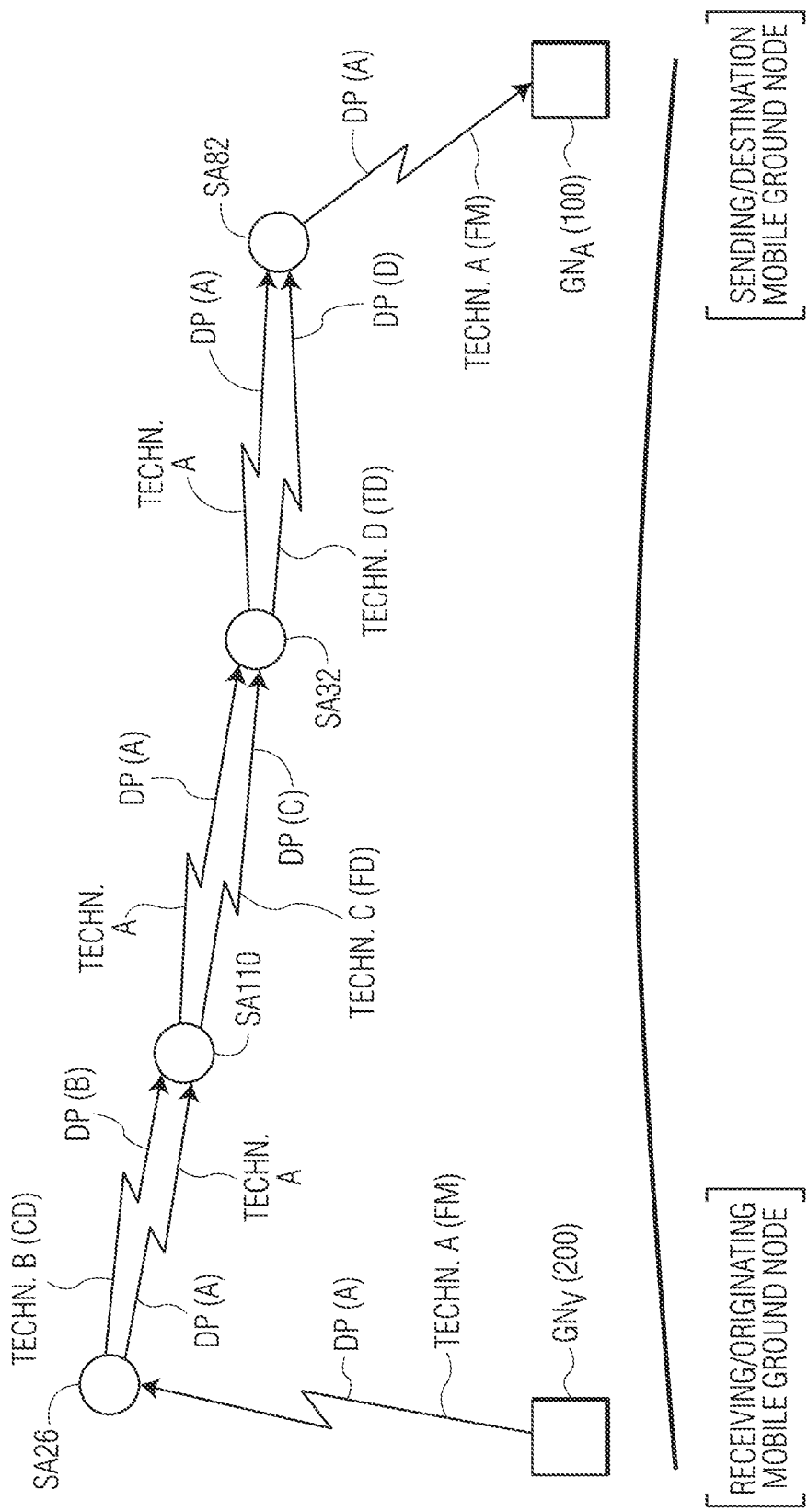
FIG. 5 illustrates the use of radio technology diversity in a multi-satellite radio route for data transmissions in a radio route comprising at least one mobile ground node.

FIG. 5 illustrates a method in which the following exemplary radio technologies (signal formats) are available for data transmission:

Technology A—Frequency modulation ("FM")
Technology B—Code division ("CD")
Technology C—Frequency division ("FD")
Technology D—Time division ("TD")

Those skilled in the art will understand that these are meant to be representative of myriad signal formats that the system can employ. Another example is using data transmissions sent at different bit rates.

The selection of a particular protocol for application of the diversity principles described herein can be made in accordance with various algorithmic approaches, described just below in connection with FIGS. 5 and 6. As already noted, space diversity techniques described in the '950 application can be used in addition to the various signal diversity techniques described herein.

Referring again to FIG. 5, the route depicted assumes that the sending ground node $GN_A$ comprises an aircraft such as the aircraft 100 described above in connection with FIG. 1 and the receiving node $GN_V$ comprises a vehicle such as the automobile 200 described above in connection with FIG. 2. In the present example, the ground nodes will have four different chip sets, one for each of the routing technologies A through D listed above. The satellites will be configured as discussed above in connection with FIG. 4, and as with the ground nodes, each satellite will have four different chip sets, one for each of the listed routing technologies. In other words, the ground nodes and the satellites are capable of coding and decoding data transmissions in any of the listed technologies or signal formats A through D.

FIG. 5 illustrates one example of transmitting data through a constellation comprising 220 satellites via a five-link route created according to any of the route creation protocols for data transmission from the vehicle node $GN_V$ (serving as a "receiving/originating" ground node) to the aircraft node $GN_A$ (serving as a "sending/destination" ground station). Using the antenna selected in the route creation process, the route will transmit a data packet from the vehicle 200, via satellite SA26, satellite SA110, satellite SA32, and satellite SA82, to the aircraft 100. This route can include satellites at different levels to the advantages per the above discussion, and as discussed in more detail in the '1018 application. For example, the system may be able to assemble routes with higher overall quality and greater stability via aerial nodes at different altitudes, which will be particularly advantageous in data transmissions involving mobile ground nodes.

FIG. 5 traces the transmission of a data packet DP from the vehicle 200 via the illustrated four-satellite route to the aircraft 100. In this example, the ground nodes are programmed to send and receive data only in radio technology A (FM), without using diversity principles, as indicated by the notation DP(A) associated with the signal arrow from the mobile ground node $GN_V$ (vehicle 100) to the satellite S26 and the signal arrow from the satellite S82 to the mobile ground node $GN_A$ (aircraft 100). Frequency modulation is chosen for ground/satellite data transmissions because it is already in widespread use for cellular telephony and thus will require minimal modification of the operation of existing ground stations. However, in other implementations the signal format diversity techniques described below for satellite-to-satellite communications can be applied to ground/satellite communications.

One method of implementing the diversity techniques according to the principles described in the present disclosure is to send two data packets with the same content in two different signal formats. If each version of the data packet comprises 200 bytes, an error detecting code could be inserted every 20 bytes, resulting in the transmission of 10 different segments that can be checked for errors. The node receiving the two data packets would then perform a segment-by-segment comparison between them and choose which segments to use to reconstruct the 200 byte data packet. In other words, the processors in the satellites can assemble the best of the 20-byte segments into a single 200-byte packet to recreate the content transmitted from the node that sent the two data packets.

In the FIG. 5 embodiment, the notation "DP(X)" used for satellite-to-satellite data transmission follows the convention whereby "X" is the signal format. When the satellite S26 receives the data packet transmitted by the ground node $GN_V$, it decodes it using its chip set dedicated to Technology A (frequency modulation). See FIG. 3. In the present embodiment each satellite will use Technology A as one of the technologies to provide signal format diversity in the satellite-to-satellite links in the radio route. The processor S110 or S210 in the satellite SA26 then decides which signal format B, C, or D to use in combination with Technology A. This can be accomplished by using a look-up table in the satellite that was populated during route creation. As described in the assignee's prior patents and applications, particularly the '536 patent, the '341 application, and the '1008 application, each satellite will have stored the identity of the antenna to use to transmit the data to the next node in the route. Each satellite will also determine link qualities that indicate the relative integrity of the link to the next node in the route via the associated antenna. During route creation the processor in each satellite will have stored in the look-up table the quality of the link associated with the antenna that will be used to transmit the data to the next satellite. It will be understood from the assignee's prior patents and applications that in the assignee's systems a particular satellite may store the identities of many antennas and their respective qualities corresponding to each of a plurality of routes between different ground stations.

In an exemplary implementation, a code division technology such as Code Division Multiple Access (also known as "spread spectrum") can be used as Technology B for lower quality links because it is known to perform well over noisy radio channels. For intermediate quality signals, a time division technology such as Time Division Multiple Access could be used because it involves sending two separate signals, thus increasing the probability that the data packet can be accurately re-assembled. For qualities in the highest range, a frequency division technology that may be more prone to interference, such as such as Frequency Division Multiple Access could be used to take advantage of the fact that the two data transmissions can be made simultaneously from the same antenna.

In operation the satellite SA110 receives the two versions of the data packet, DP(A) and DP(B), and performs error correction as described above and transmits the corrected data packets on to satellite SA32 using the antenna identified during route creation. The satellite SA110 consults its look-up table associated with that antenna and determines that the corrected data packet should be transmitted using Technology C as DP(C) in combination with Technology A as data packet DP(A). Data transmission proceeds in this fashion from satellite to satellite. In FIG. 4, it is assumed that the data packet corrected at the satellite SA32 will be forwarded to the satellite SA82 using Technology D, i.e., as DP(D), and, as noted in FIG. 5, using Technology A, i.e., as DP(A). When the data reaches a satellite having an antenna associated with the destination ground node $GN_A$, it transmits the data accordingly.

The system depicted in FIG. 5 and described above can be modified in numerous ways depending on different deployment strategies and the environment in which the system will be used. For example, it will be readily apparent to one knowledgeable in radio technology that signal format diversity can be applied to satellite/ground station data transmissions. In addition, complete signal format diversity between the system nodes can also be employed. For example, instead of having one signal format such as frequency modulation as one of the signal formats between all of the satellites, it is within the scope of the invention to have other node-to-node signal format diversities. As another example of a variation within the scope of the invention, the satellites can be configured with downward facing antennas as described in connection with FIG. 12 of the '136 patent. In that case, a satellite would know that the data packet it has on board is directed to a ground station because the designated antenna for transmission thereof is pointing downward toward the earth. It will also be appreciated that a system such as that depicted in FIG. 5 can support cellular telephony in which separate frequency bands would be used for communications between the satellite SA82 and the mobile ground node $GN_A$.

Figure 6:
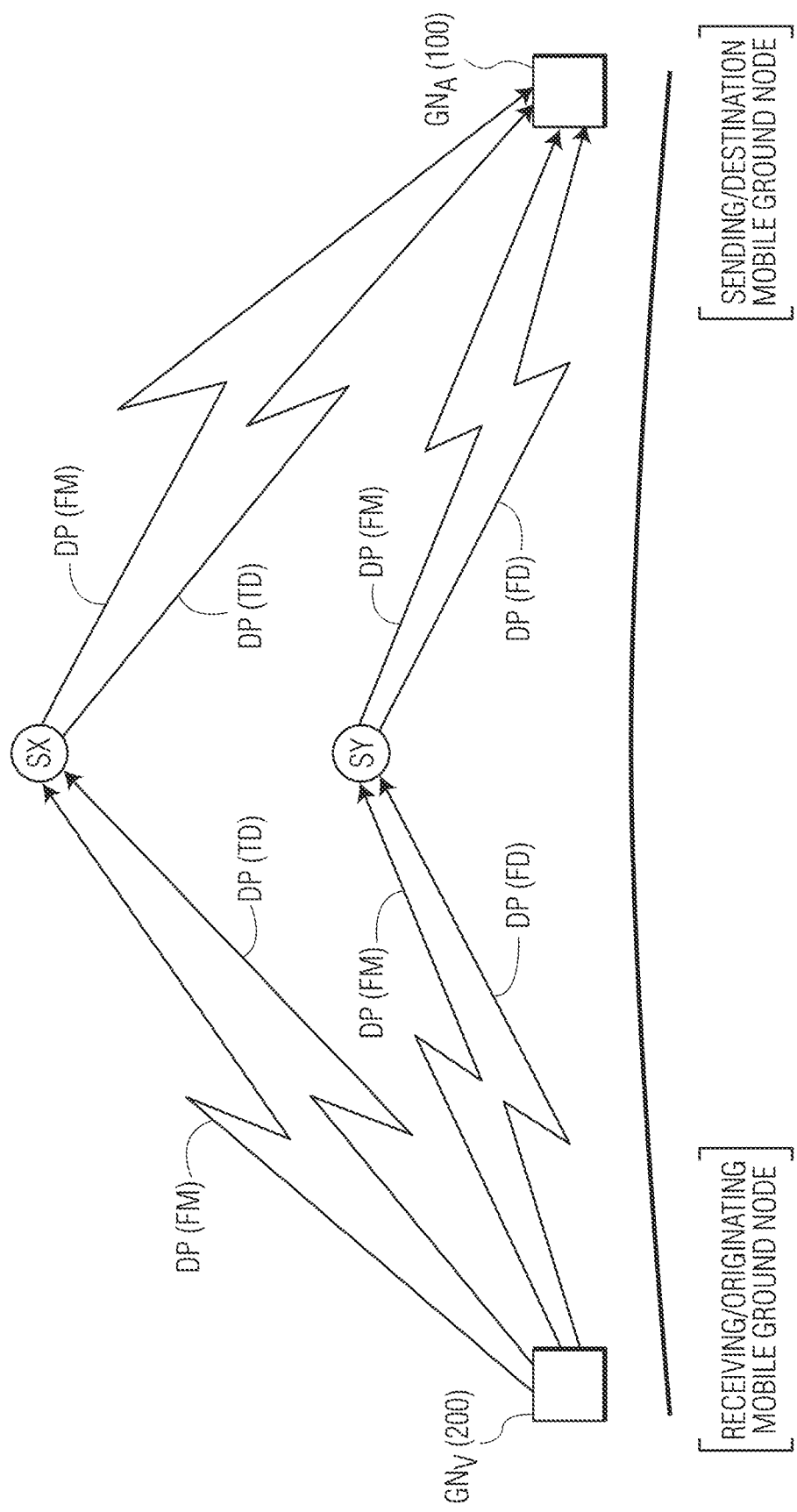
FIG. 6 illustrates the use of space diversity in combination with radio technology diversity for data transmissions in a radio route comprising at least one mobile ground node.

FIG. 6 schematically illustrates a system that employs space diversity in combination with two different types of signal format diversity. In the figure the signal format diversities are time division diversity and frequency division diversity, but it will be appreciated that any of the various signal formats can be used to implement this aspect of the system depicted in FIG. 6. The system also incorporates space diversity by sending the same data packet via two different routes in the manner described in the '1018 application and the '950 application. It will be appreciated that FIG. 6 illustrates a bent pipe system, but the space/technology diversity protocol described here can also be applied to a route with one or more satellite-to-satellite links. In that regard, the system may be able to assemble routes with higher overall quality and greater stability via aerial nodes at different altitudes, as discussed above in connection with FIG. 5.

FIG. 6's notation is similar to that used in connection with FIG. 5. The data packets sent from the mobile vehicle ground node $GN_V$ are designated by the notation "DP(TD)" for data packets sent using a time division signal format, and "DP(FM)" denotes data packets sent using a frequency modulated signal format. As described in the "Space Diversity" section of the '1018 application and in the '950 application, the routing protocol will have identified at least two separate routes for sending data content to the mobile aircraft ground node $GN_A$. The vehicle ground node will store the identities of the antennas on which it received routing signals from different satellites and the respective routing signal qualities. The processing circuitry in the vehicle will identify the antennas associated with the two highest quality routing messages received from satellites in the constellation.

Signal format diversity is added by sending the same data packet from both of those antennas in different signal formats. As noted in the previous paragraph, the data packet is sent from each ground station antenna in a time division signal format and a frequency division data format. These two signals are received by each of the satellites SX and SY, which perform the error correction and re-assembly of the received different data packet versions discussed above. Each satellite then sends the corrected data packet in two formats (time division and frequency modulation) on its antennas identified during route creation as being linked with the aircraft mobile ground node $GN_A$. This node thus has four versions of the same data packet in 10 segments, each having an error correction code associated with it. The processing circuitry in the mobile node $GN_A$ applies the appropriate error correction algorithm to each segment and reassembles the data packet using the segments with the fewest errors. In this fashion, the data packet has been subjected to three kinds of diversity to ensure the integrity of the content transmitted from vehicle 200 even further.

The above discussion regarding the use of diversity principles to enhance the integrity of data transmissions employs satellites and ground stations that can transmit, receive, and decode radio signals in all of the available radio technologies. However, in a given system all of the nodes might not have that capability. This may be the case especially with mobile personal devices such as smartphones and tablet computers, but it may also apply to the satellite nodes as well. In that case the route creation process begins by transmitting initial information signals from all of the antennas of all of the terrestrial nodes (including fixed nodes and mobile nodes such as airplanes, automobiles, etc.), in all of the particular technologies available to each node. Route creation then proceeds in a fashion analogous to that already described, although in the present embodiment each initial information signal (sent from the terrestrial nodes) and each routing signal (sent from the satellite nodes) includes a list of the radio technologies by which that node can receive and transmit. A satellite receiving the initial information signal or routing message compares the received list to radio technologies in an onboard list of technologies that it can receive and transmit. Then, based on the quality of the signal received, the node's route creation circuitry chooses a matching pair or pairs of technologies. That is, the node (satellite or receiving terrestrial node) stores the identity of the antenna or antennas on which the highest quality initial information signal(s) or routing signal(s) were received for each radio technology of the received signal(s) or message (s), in the same manner as discussed above in a system in which all of the nodes support all of the same radio technologies. Each node processes received routing messages in the same manner. For example, if a terrestrial node sends an initial information signal in radio technologies A, B and C, a satellite that can only receive radio technologies A and C forms a link with the terrestrial node that will only support those technologies. When that first satellite sends its routing messages in the next step of the routing process described above, other satellites that can only receive and transmit on radio technology A form links with the first satellite. in this fashion routes are created from receiving (originating) terrestrial nodes to sending (destination) terrestrial nodes, but the routes may support data transmissions in one or more of the available radio technologies.

Data transmission from an originating (receiving) terrestrial node to a destination (sending) terrestrial node proceeds generally as already described in connection with a system in which all of the nodes are capable of coding and decoding signals in all of radio technologies available to the system. In particular, an originating terrestrial node with data onboard addressed to a particular destination node can, as a result of the routing process, transmit the data using the antenna or antennas on which it received routing messages. For example, if the originating node is capable of transmitting in only one radio technology, it will transmit the data in that technology. If it has more than one route in that technology it can employ space diversity to enhance the integrity of the transmission by providing more than one data packet to decode at the destination terrestrial node. Routes that support more than one radio technology will be able to employ signal format diversity, and maybe space diversity as well, in accordance with the principles described above in connection with a system that supports all radio technologies system-wide.

Not only is this kind of system more versatile and applicable across more platforms, it also enables incorporation into a radio route of existing satellites. That is, there are myriad communication satellites already in orbit, such as those in an Iridium® system. If an existing communication satellite is capable of coding and decoding any of the radio technologies used in the present system just described, it can readily be incorporated into a radio route—and participate in data transmission—by a straightforward reprogramming of its onboard computers. One of the advantages of incorporating satellites already in orbit is that it affords additional opportunities for incorporating diversity without necessitating the launch of additional satellites. Although the satellites described in the assignee's patents and applications referenced are expected to cost orders of magnitude less than conventional communication satellites, using satellites already in orbit will nevertheless reduce the cost of employing diversity in data transmissions in comparison to the cost of providing the same degree of diversity by manufacturing and launching additional satellites of the type described herein.

SUMMARY

The present disclosure describes communications systems using aerial nodes of one or more types—drones, balloons, or satellites—to provide radio routes supporting data transmission between mobile terrestrial nodes. The mobile users can be in vehicles, aircraft, or watercraft, or individuals with mobile devices (e.g., smartphones or tablet computers) desiring to communicate with other users in communication with the system's' aerial nodes. Mobile nodes using the communications systems described herein have antennas for receiving and transmitting radio signals in the semi-spherical space above the mobile node, thus facilitating the creation of radio links with directional antennas in the aerial nodes to the end of creating a radio route between the terrestrial nodes. The system preferably comprises a constellation of satellites whose locations are functionally random vis-à-vis any particular location on the earth's surface. The satellites do not require thrusters and rocket fuel to maintain them in particular orbits or at particular altitudes, or even in fixed attitudes. The integrity of data transmissions is improved by incorporating spatial and/or signal diversity to provide multiple transmission paths for the data.

Those skilled in the art will readily recognize that only selected preferred embodiments of the invention have been depicted and described, and it will be understood that various changes and modifications can be made other than those specifically mentioned above departing from the spirit and scope of the invention, which is defined solely by the claims that follow.

What is claimed is:

1. A radio communication system comprising a radio route for transmitting data from an originating terrestrial node to a destination terrestrial node via at least one of a constellation of aerial nodes, wherein:
at least one of said originating terrestrial node and said destination terrestrial node comprises a mobile terrestrial node capable of being transported from place to place by motive power applied thereto;
said originating terrestrial node and said destination terrestrial node each include a plurality of directional antennas for transmitting radio signals to said aerial nodes and receiving radio signals from said aerial nodes, said terrestrial node directional antennas being capable of receiving and transmitting radio signals in the semi-spherical space above each said terrestrial node relative to the earth's surface;
each said aerial node includes a plurality of directional antennas for transmitting radio signals to said terrestrial nodes and receiving radio signals from said terrestrial nodes, said aerial node directional antennas being capable of receiving and transmitting radio signals in the spherical space around each said aerial node; and
each said terrestrial node and each said aerial node includes coding/decoding circuitry for coding a packet of the data for multiple transmissions by at least one said antenna thereof in multiple signal formats different from each other and decoding a coded packet of data received from an aerial node on at least one said antenna of said terrestrial node in said multiple different signal formats, wherein said different signal formats comprise different bit rates and any node receiving said multiple transmissions of the coded packet of data reassembles the data packet from the multiple different transmissions.

2. A radio communication system as described in claim 1, wherein at least one said mobile terrestrial node comprises a wheeled vehicle for traveling on the ground and having a vehicle engine for driving wheels of the vehicle to move it from place to place.

3. A radio communication system as described in claim 1, wherein at least one said mobile terrestrial node comprises a heavier-than-air aircraft including at least one aircraft engine for providing thrust to move the aircraft from place to place.

4. A radio communication system as described in claim 1, wherein at least one said mobile terrestrial node comprises a personal computing device carried from place to place by a human user.

5. A radio communication system as described in claim 1, wherein said directional antennas have beam axes arranged for transmitting and receiving radio signals in at least two directions.

6. A radio communication system as described in claim 5, wherein said directional antennas have beam widths capable of transmitting and receiving radio signals over substantially the entire semi-spherical space above said mobile terrestrial node.

7. A radio communication system as described in claim 1, wherein a plurality of said aerial nodes comprise a constellation of multiple orbiting satellites.

8. A radio communication system as in claim 7, wherein a plurality of said satellites are in uncontrolled, stochastically distributed orbits.

9. A radio communication system as described in claim 1, wherein at least one said aerial node comprises a solar powered, heavier-than-air unmanned aircraft.

10. A radio communication system as described in claim 1, wherein said coding/decoding circuitry in a plurality of said aerial nodes is configured for coding data packets for transmission in at least one additional signal format selected from frequency modulation, code division, frequency division, and time division and for decoding data packets received in the same signal formats.

11. A method of transmitting data from an originating terrestrial node to a destination terrestrial node via a radio communication route system including a plurality of orbiting satellites, wherein:
at least one of said originating terrestrial node and said destination terrestrial node comprises a mobile terrestrial node capable of being transported from place to place by motive power applied thereto, a plurality of antennas for transmitting and receiving radio signals in multiple directions in the semi-spherical space above said mobile terrestrial node relative to the earth's surface, and circuitry for processing radio signals received on said directional antennas from said aerial nodes and selecting one of said directional antennas based on the relative qualities of the received radio signals, and
said satellites include a plurality of directional antennas for transmitting radio signals to said terrestrial nodes and receiving radio signals from said terrestrial nodes, said satellite directional antennas being capable of receiving and transmitting radio signals in the spherical space around each said satellite,
the method comprising:
receiving at the originating terrestrial node an original packet of data including an address designating the destination terrestrial node;
coding the data packet and transmitting the coded data packet from the originating terrestrial node in a first direction and a second direction different from said first direction;
decoding a coded data packet received at a first satellite to produce a first reassembled data packet;
coding the first reassembled data packet for transmission in a predetermined direction associated with the destination terrestrial node address;
decoding a coded data packet received at a second satellite to produce a second reassembled data packet;
coding the second reassembled data packet for transmission in a predetermined direction associated with the destination terrestrial node address; and
decoding multiple transmissions of reassembled data packets received by the destination terrestrial node to produce a final data packet intended to re-create at the destination terrestrial node the original packet of data received at the originating terrestrial node,
wherein said coded data packets are transmitted in multiple signal formats comprising multiple different bit rates.

12. A method as described in claim 11, wherein:
each data packet comprises content divided into segments, with each segment including error correction coding; and
each system node includes processing circuitry for generating error-corrected content by applying error correction to each segment received in said multiple transmissions and reassembling the data packet from the separate error-corrected segments deemed to have the fewest errors.

13. A method as described in claim 12, wherein coding/decoding circuitry in a plurality of the satellites is configured for coding data packets for transmission in at least one additional signal format selected from frequency modulation, code division, frequency division, and time division and for decoding data packets received in the same signal formats.

14. A method as described in claim 11, wherein at least one said mobile terrestrial node comprises a wheeled vehicle for traveling on the ground and having a vehicle engine for driving wheels of the vehicle to move it from place to place.

15. A method as described in claim 11, wherein at least one said mobile terrestrial node comprises a heavier-than-air aircraft including at least one aircraft engine for providing thrust to move the aircraft from place to place.

16. A method as described in claim 11, wherein at least one said mobile terrestrial node comprises a personal computing device carried from place to place by a human user.

17. A method as described in claim 11, wherein said directional antennas have beam axes arranged for transmitting and receiving radio signals in at least two directions.

18. A method as described in claim 17, wherein said directional antennas have beam widths capable of transmitting and receiving radio signals over substantially the entire semi-spherical space above said mobile terrestrial node.

19. A method as described in claim 11, wherein a plurality of said satellites are in uncontrolled, stochastically distributed orbits.

* * * * *